(12) United States Patent
Thompson et al.

(10) Patent No.: US 10,960,499 B2
(45) Date of Patent: Mar. 30, 2021

(54) FLEXIBLE WELDING APPARATUS

(71) Applicant: Jayco, Inc., Middlebury, IN (US)

(72) Inventors: Joseph B. Thompson, Union, MI (US); Steven J. Romanowski, Albion, IN (US); Todd B. Lozier, Elkhart, IN (US)

(73) Assignee: Thor Tech, Inc., Elkhart, IN (US)

( * ) Notice: Subject to any disclaimer, the term of this patent is extended or adjusted under 35 U.S.C. 154(b) by 79 days.

(21) Appl. No.: 16/366,386

(22) Filed: Mar. 27, 2019

(65) Prior Publication Data

US 2020/0306899 A1 Oct. 1, 2020

(51) Int. Cl.
*B23K 37/04* (2006.01)
*B23K 101/24* (2006.01)

(52) U.S. Cl.
CPC ...... *B23K 37/0426* (2013.01); *B23K 2101/24* (2018.08)

(58) Field of Classification Search
CPC ............................................. B23K 37/04–0538
USPC ................................ 228/44.3–49.6, 212–213
See application file for complete search history.

(56) References Cited

U.S. PATENT DOCUMENTS

| | | | | |
|---|---|---|---|---|
| 2,671,957 A | * | 3/1954 | Sheffer | B61D 7/00 228/184 |
| 2,683,433 A | * | 7/1954 | Schanz | B23K 37/047 193/35 R |
| 3,568,300 A | * | 3/1971 | Zidell | B23K 37/0426 228/173.6 |
| 5,328,161 A | * | 7/1994 | Stuck | B23K 37/0426 269/17 |
| 8,459,526 B2 | | 6/2013 | Hong et al. | |
| 9,862,088 B2 | | 1/2018 | Prado | |
| 2005/0072829 A1 | | 4/2005 | Wildmann et al. | |
| 2011/0101589 A1 | | 5/2011 | Engel | |
| 2015/0001279 A1 | * | 1/2015 | Yao | B62D 65/024 228/49.1 |
| 2017/0320156 A1 | * | 11/2017 | Rinker | B23K 9/007 |

FOREIGN PATENT DOCUMENTS

| | | | | |
|---|---|---|---|---|
| DE | 102013217647 A1 | * | 3/2015 | ............. B23K 26/30 |
| JP | 2000-102876 A | | 4/2000 | |
| KR | 20-0460560 Y1 | | 6/2012 | |

OTHER PUBLICATIONS

PCT International Search Report dated Jul. 7, 2020, for corresponding PCT Application No. PCT/US2020/022957.
PCT International Written Opinion dated Jul. 7, 2020, for corresponding PCT Application No. PCT/US2020/022957.

* cited by examiner

*Primary Examiner* — Kiley A Stoner
(74) *Attorney, Agent, or Firm* — Warner Norcross + Judd LLP

(57) ABSTRACT

A welding fixture includes a flexible substrate, which is sufficiently flexible to be reconfigurable between a planar configuration and a folded or rolled compact configuration and is dimensioned to support a plurality of frame members to form a structural frame for a recreational vehicle (RV). The welding fixture further includes a plurality of guide surfaces mounted to the flexible substrate, which are arranged on the flexible substrate to align the frame members in a predefined arrangement with a plurality of weld points and to align the frame members in the predefined arrangement while being welded together at the weld points.

20 Claims, 10 Drawing Sheets

FLEXIBLE WELDING APPARATUS

TECHNICAL FIELD AND BACKGROUND

Recreational vehicle (RVs) components, such as walls (including interior walls and sidewalls), floors, and ceilings, are often formed from a laminated panel. These panels are typically reinforced by an interior structural frame, typically an aluminum frame, which is welded together. In some RVs, the sidewalls are formed from fiberglass reinforced panels, which do not have internal frames, often referred to as "free hung" panels. They too are laminated layers, but have the added reinforcement of fiberglass so that they can be directly mounted to the frame of an RV without the internal frame described above.

Assembling these frames (both internal frames and RV frames to which free hung panels are mounted) requires significant space. A typical sidewall frame ranges from 26 feet to 46 feet in length and weighs in a range of about 170 lbs. to 210 lbs., and in some cases upward of 250 lbs. The most common method of manufacturing a welded sidewall frame, for example, in the industry is by "stack welding" on a weld table. Stack welding consists of taking a welded master frame, which can support several frames stacked on top of it, and laying it on a welding table large enough to support the master frame and the stacked frames. The frame members (e.g. cut aluminum tube pieces) to be welded are then loaded onto the master frame and either clamped to the master frame or held in place by hand to facilitate welding of the welded seams. Subsequent frame members can then be loaded onto the top frame and welded one on top of the other frame until the designated capacity of the master frame is reached. This process of welding frames on top of frames, using the master frame below as the jig for the frame to be welded, is commonly referred to as stack welding.

This stacked welding method of manufacturing is also used for the fabrication of the frames for floors, rear walls, roofs, interior and partition walls, including accessory compartments frames, in the RV industry and in other industries.

Because these master frames are unique for each frame application, which may vary for each RV, RV manufacturers require a large number of master frames and, hence, significant storage space to store the frames when not in use. Further, given their weight and size, handling of the master frames can be unwieldy. Additionally, because the master frames are typically stored on their sides in a stacked, leaning arrangement, there is a tendency for the frames to bend and warp over time. Therefore, the maintenance and repair of these master frames represents an additional step and cost.

Accordingly, there is a need for fixturing system that can eliminate the use stack welding and the associated used of master frames, but that will still provide the desired fixturing while requiring less space and providing easier handling.

SUMMARY

Accordingly, in one embodiment, a welding fixture includes a flexible substrate that is sufficiently flexible to be reconfigurable between a planar configuration and a folded or rolled compact configuration and is dimensioned to support a plurality of frame members while being welded to form a structural frame, such as a structural frame for a recreational vehicle (RV) or other industries. The welding fixture further includes a plurality of guide surfaces mounted to the flexible substrate, which are arranged on the flexible substrate to align the frame members in a predefined arrangement with a plurality of weld points and to align the frame members in the predefined arrangement while being welded together at the weld points.

In one form, the flexible substrate comprises a fiber reinforced sheet of material, such as a fiber reinforced sheet of vinyl.

In any of the above, the welding fixture further includes a plurality of patches of heat dispersing material located on the flexible substrate in locations to correspond to the weld points to disperse heat from the welding at the weld points. For example, the patches may comprise metal-based patches, including copper or steel patches.

In any of the above, the guide surfaces are arranged on the flexible substrate into at least a first group of guide surfaces, with the first group of guide surfaces arranged to align a first frame member and a second frame member of the plurality of frame members in an abutting relationship to form a first weld point of the weld points.

In yet a further form, the guide surfaces are arranged on the flexible substrate into a second group of guide surfaces, which are arranged to align the second frame member and a third frame member of the plurality of frame members in an abutting relationship to form a second weld point of the weld points.

According to yet further forms, the guide surfaces are arranged on the substrate into a third group of guide surfaces, which are arranged to align the second frame between the first and second groups of guide surfaces.

In any of the above, the welding fixture may further include a first patch of heat dispersing material located on the flexible substrate to correspond to a first weld point and a second patch of heat dispersing material plurality located on the flexible substrate to correspond to a second weld point.

In any of the above, the welding fixture includes rigid plates secured to the flexible substrate, which form the guide surfaces. Suitable rigid plates include metal plates. Further, the guide surfaces may be straight or curved depending on the shape of the frame member. For example, the rigid plates may be secured to the flexible substrate with adhesive.

In any of the above, the flexible substrate may also include a visual guide, such as an outline of the frame to be welded, for aligning the frame members in addition to the guide surfaces.

To facilitate handling of the frame members on the substrate, any of the above substrates may be tensioned across a support surface, such as a welding table, and may optionally include a gripping surface to facilitate handling, including tensioning of the flexible substrate.

For example, the gripping surface may be formed by a cord, such as a rope, that is secured to the edge of the substrate. In one embodiment, the cord is secured by sewing a loop at the edge of the substrate and the cord is threaded into the loop or the cord may be simply attached the edge, such as by sewing or adhesive. The cord may extend along a portion of the perimeter, such as along two or more sides of the substrate or just a portion or portions of the sides, or it may extend around the full perimeter.

In another embodiment, a welding fixture for holding components to be welded includes a flexible substrate, which is sufficiently flexible to be reconfigurable between a planar configuration and a compact configuration and which is dimensioned to support a plurality of frame members to form a structural frame. The welding fixture further includes a plurality of guide members mounted to the flexible substrate in an arrangement of rows and columns to define there between receiving spaces for receiving and aligning the plurality of frame members in a predefined arrangement with a plurality of weld points and to align the components in the predefined arrangement while being welded together at the weld points.

In one form, the guide members comprise rigid plates secured to the flexible substrate.

In addition, in any of the above, the welding fixture may include a plurality of patches of heat dispersing material located on the flexible substrate in locations to correspond to the weld points to disperse heat from welding at the weld points.

According to yet another embodiment, a method of fixturing a metal frame includes the steps of providing a flexible substrate, mounting a plurality of guide members to the flexible substrate to form a plurality of receiving spaces in a predefined arrangement, aligning frame members in the receiving spaces between the guide members in the predefined arrangement, and welding the frame members together at a plurality of weld points to form the metal structural frame.

In one form, the flexible substrate is supported on a table.

In any of the above methods, the flexible substrate may be tensioned.

Accordingly, a welding fixture for a frame and method of fixturing a frame for welding is disclosed that can be easily stored and handled.

DETAILED DESCRIPTION OF THE FIGURES

DETAILED DESCRIPTION

Figure 1:
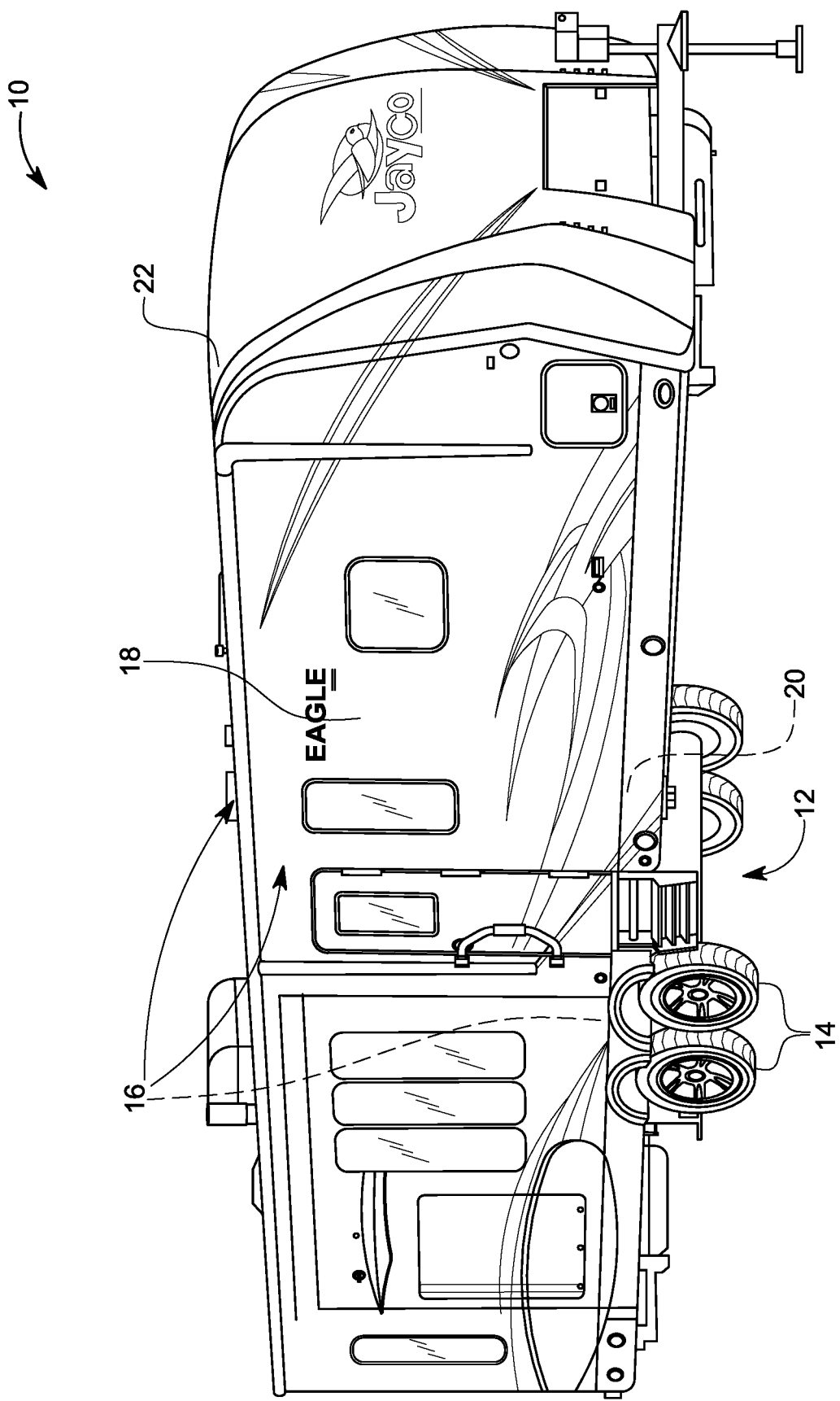
FIG. 1 is a perspective view of a recreational vehicle.
Figure 1A:
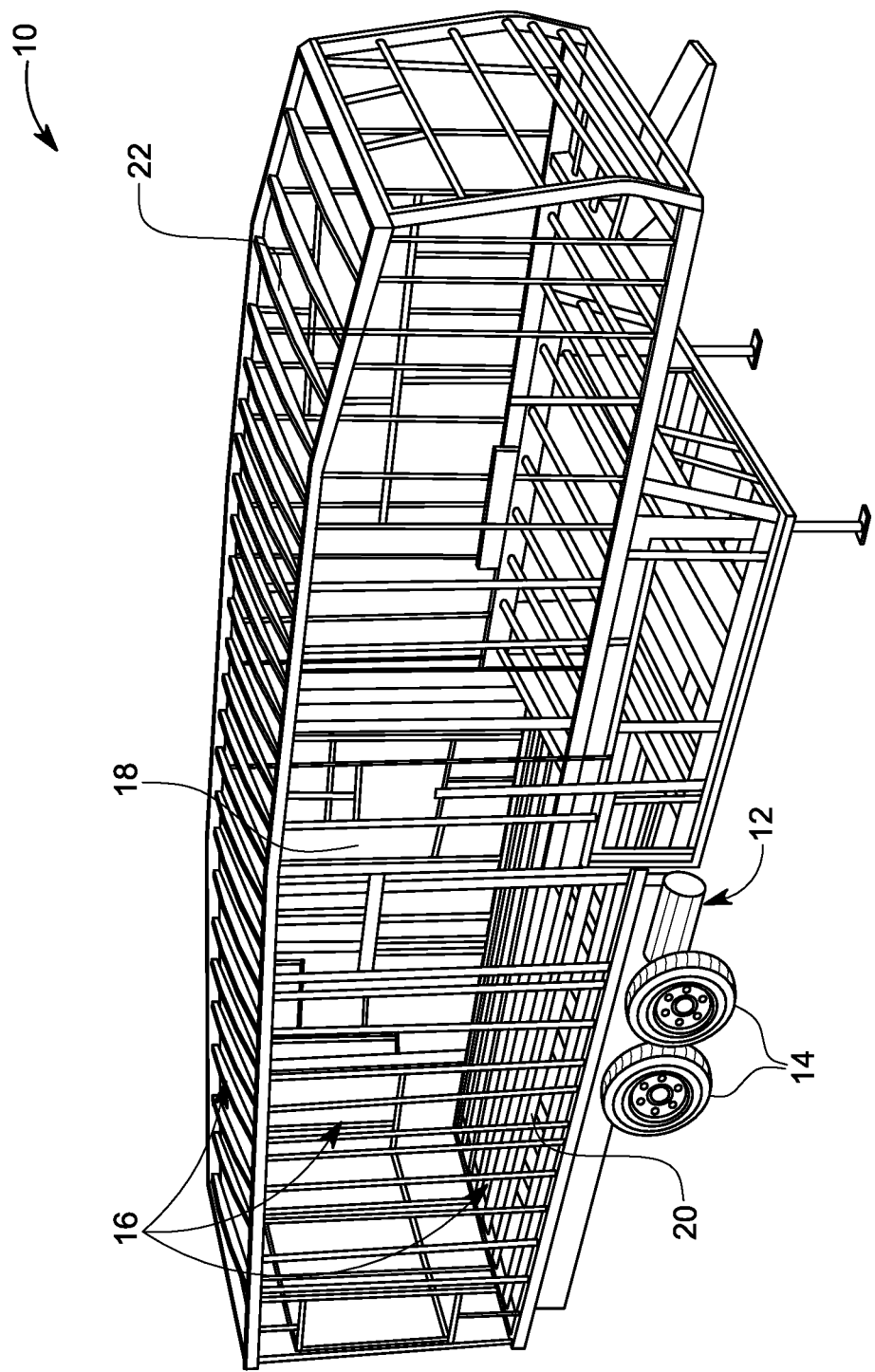
FIG. 1A is a similar view to FIG. 1 with the laminated panels, slide-out, windows, and doors removed to show the underlying frames.

Referring to FIG. 1, the numeral 10 generally designates a recreational vehicle (RV). Recreational vehicle 10 includes a chassis 12, a plurality of wheels 14, which are mounted to chassis 12, and a plurality of frames 16 that form structural panels or are covered with panels to form walls, such as sidewalls 18, a floor 20, and/or ceiling/roof 22 (see FIGS. 1 and 1A), which are mounted to the chassis 12 and assembled together form the RV cabin. As will be more fully described below, the frames 16 that form the structural panels (including sidewalls 18, floors 20, and ceiling/roof 22, as well as interior or partitions walls, including accessory compartments frames (not shown)) or to which the structural panels are mounted, may be formed using the welding fixture and method described below. Although described in reference to a structural frame of an RV, it should be understood that the fixture and method of fixturing described below may be used to fixture other frames.

For the purposes of this disclosure, frame 16 is illustrated with a simplified arrangement of frame members, namely upper and lower horizontal frame members 16a,b vertical frame members 16c, 16d, 16e, 16f, 16g, and an intermediate horizontal frame members 16h, which in the illustrated embodiment are arranged to reinforce an opening, for sample, for a slide-out. The terms upper and lower, left, right, vertical and horizontal are just used in reference to the orientation shown in FIG. 2. Further, it should be understood that additional frame members may form part of the frame, including curved frame members and frame members that are arranged to frame in and reinforce other openings, such as for doors or windows. Therefore, it should be understood that the flexible welding fixture described below may be used and configured to support a variety of different frame configurations.

Figure 2:
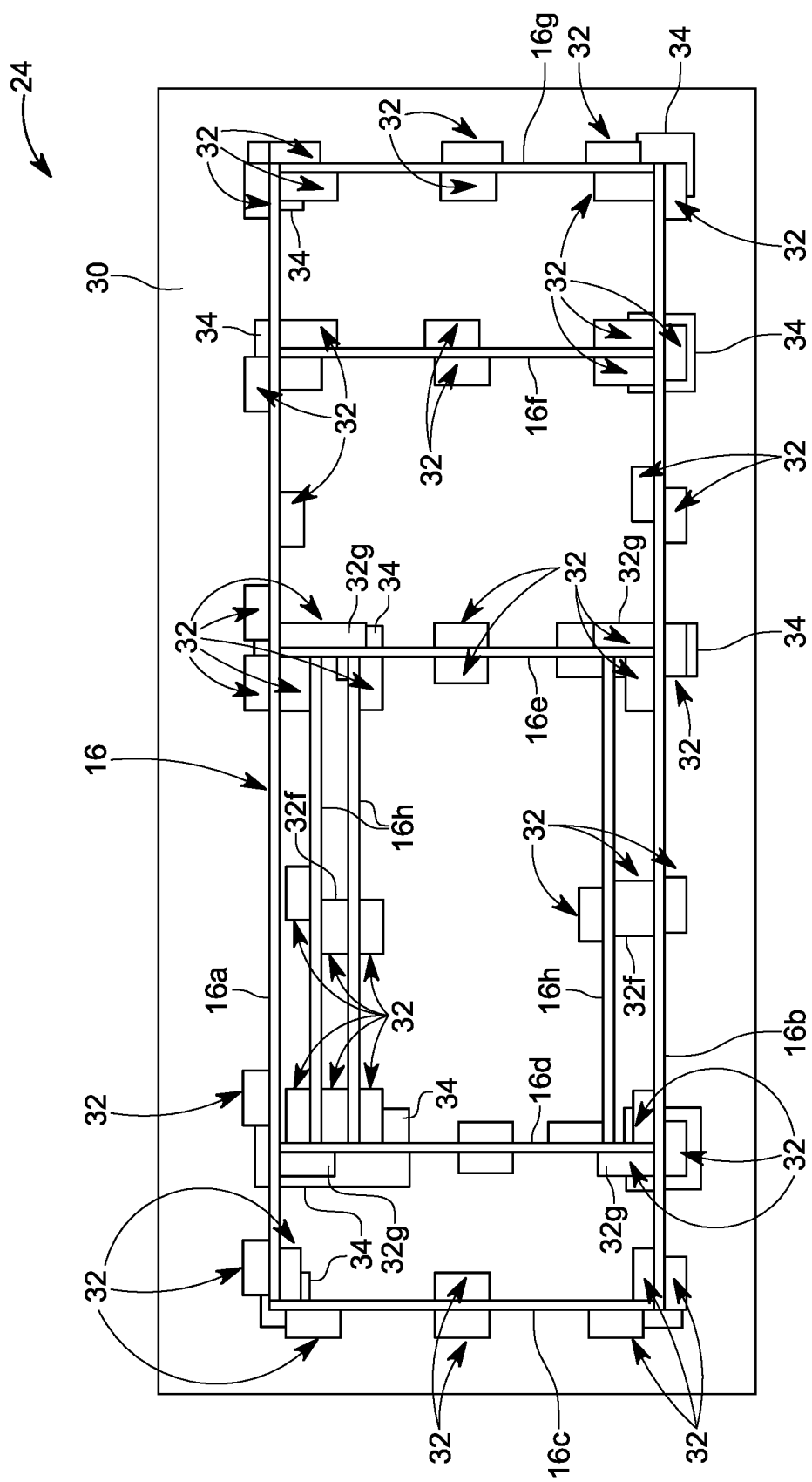
FIG. 2 is a plan view of a flexible welding fixture with a flexible substrate and a plurality of guide members holding frame members while being welded.
Figure 3:
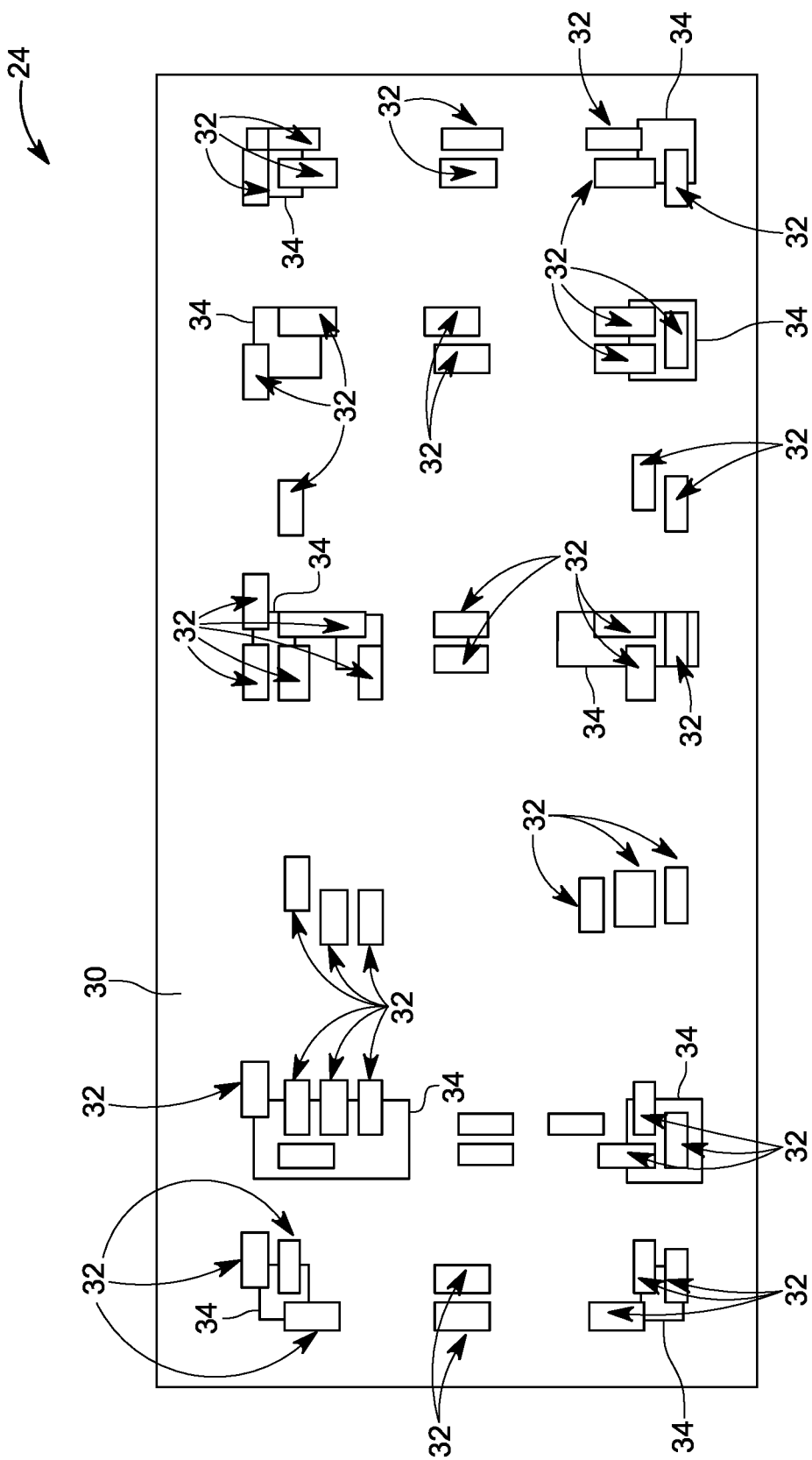
FIG. 3 is a similar view to FIG. 2 with the frame members removed for clarity.

Referring to FIGS. 2 and 3, the numeral 24 generally designates a flexible welding fixture. As will be more fully described below, flexible welding fixture 24 includes a flexible substrate 30 and a plurality of guide members 32, which are mounted to the substrate 30 to align the frame members, e.g., frame members 16a, 16b, 16c, 16d, 16e, 16f, 16g, and 16h, in a prearranged configuration for welding to form frame 16.

Figure 5:
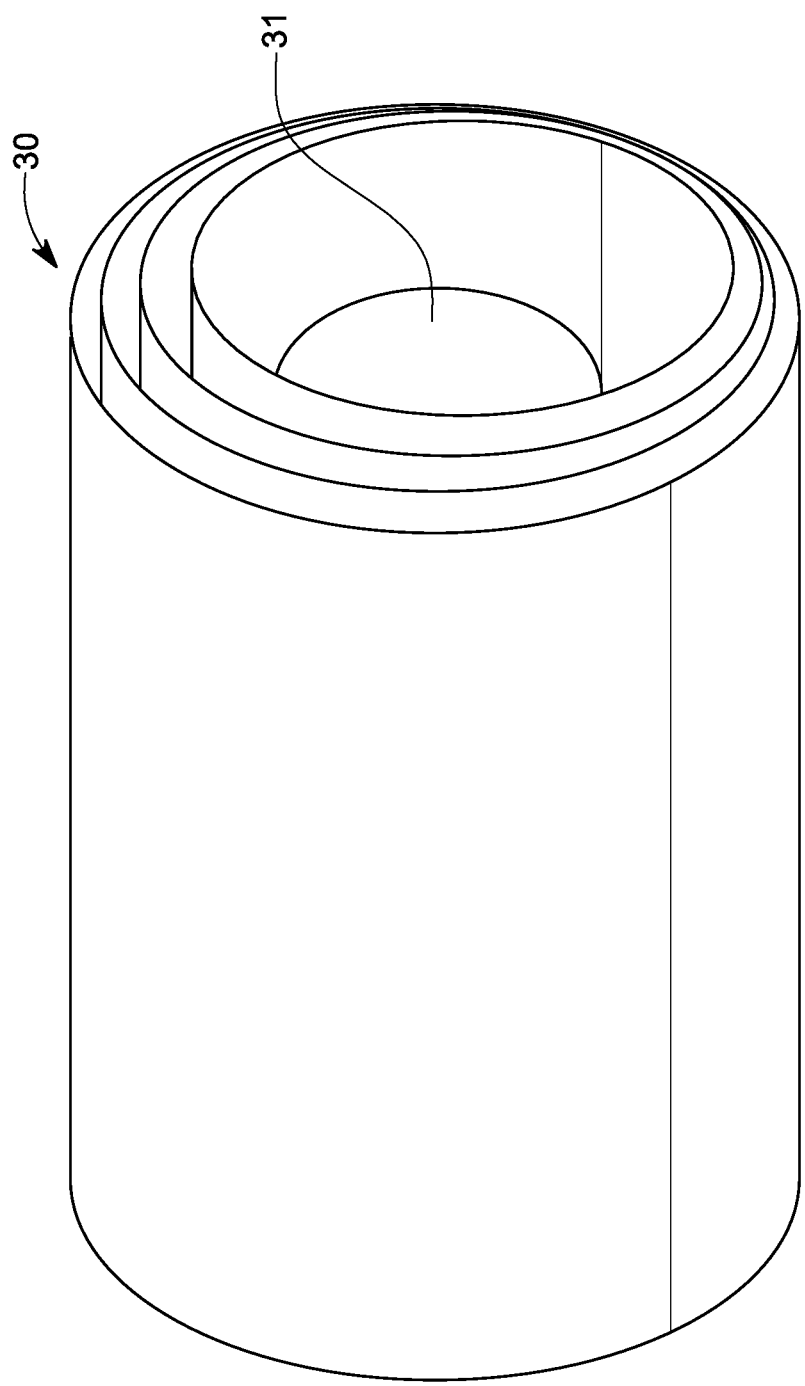
FIG. 5 is a perspective of the fixture of FIG. 3 reconfigured in a compact configuration.

Substrate 30 is sufficiently flexible to be reconfigurable between a planar configuration and a compact configuration, such as a folded or rolled compact configuration, and is dimensioned to support a plurality of frame members, e.g., frame members 16a-16h to form a structural frame for a recreational vehicle (RV). For example, substrate 30 may be sufficiently flexible to be rolled onto a core 31, such as shown in FIG. 5, which facilitates reconfiguring the substrate into its compact configuration and also facilitates handling. For example, a suitable core may include a hollow cylindrical tube, for example, formed out of a polymer, such as rigid plastic material or a cardboard construction tube, which allows, for example, a forklift operator to insert the fork into the rolled substrate 30 to move the fixture between a stowed position and an operative position, for example, on the top of a welding table.

Substrate 30 may be formed from a sheet of flexible material, such as a fiber-reinforced sheet of material, including a fiber-reinforced sheet of vinyl. In one embodiment, the material may be fire or heat resistant. In another embodiment, described below, it may include heat-dispersing elements, such as heat reflective elements, to avoid damaging the substrate. Optionally, the substrate may be formed from a plurality of panels, such as cardboard or plastic panels, which are then hinged together, for example, using living hinges or hinges formed by fabric strips, so that the substrate can be folded. Alternately, a sheet of flexible material may be provided with pockets formed therein, for example, by seams (e.g. welded or sew seams), with the panels inserted in the pockets to provide local stiffness/reinforcement, while still retaining sufficiently flexibility in the substrate so that it can be folded.

Substrate 30 may be configured in a variety of sizes to fixture a variety of different sized frames. For example, when configured for supporting RV panels, such as side walls, substrate 30 may typically range from about 30 feet in length to 50 feet in length and in a range of about 10 feet to 12 feet wide. These dimensions are not intended to be limiting and, instead, are provided an example of the order of magnitude of size for substrate 30.

As will be more fully described below, substrate 30 may include engagement surfaces so that the substrate 30 may be tensioned, for example, while on a weld table, more fully described below.

Figure 3A:
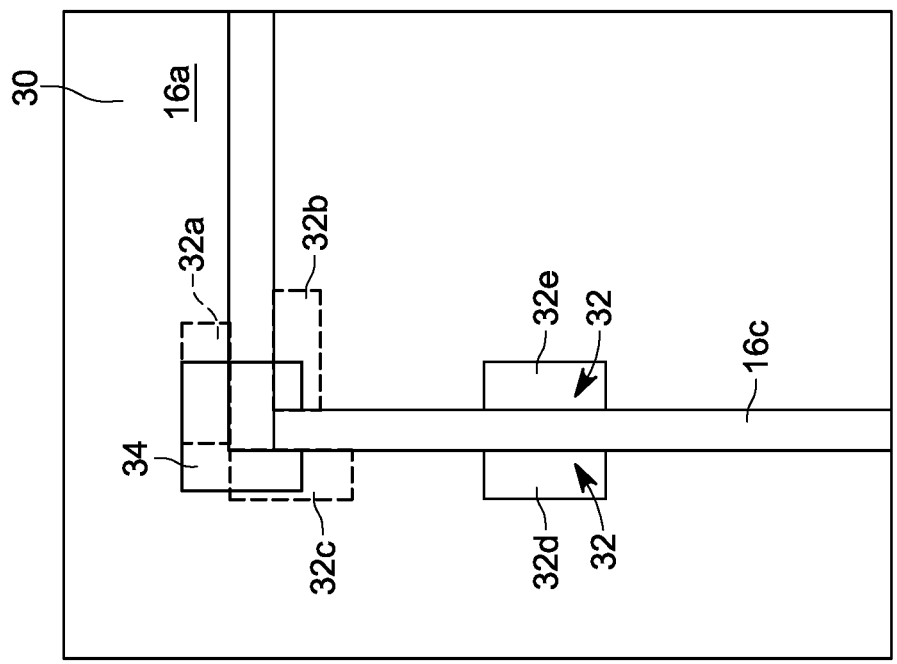
FIG. 3A is an enlarged view of detail III of FIG. 3 with several of the guide members removed for clarity.
Figure 3B:
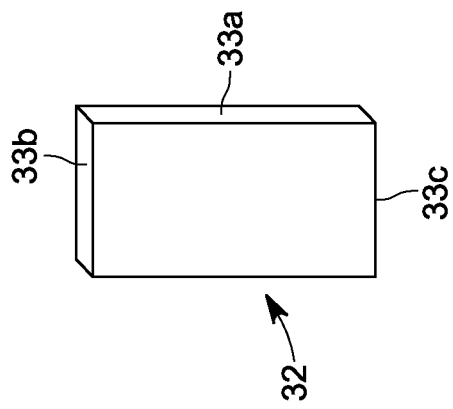
FIG. 3B is an enlarge perspective view of one embodiment of one of the guide members.

As noted above, mounted to substrate 30 is a plurality of guide members 32. As best seen in FIG. 2, guide members 32 are arranged on the flexible substrate 30 to provide guide surfaces 33a, 33b (FIG. 3B) to align the frame members 16a-16h in a predefined arrangement. Further, guide members 32 are arranged in groups on the flexible substrate 30 to align frame members so that they can be aligned in abutting relationships and then welded together in a predefined arrangement at the weld points.

Referring again to FIG. 2, guide members 32 may be arranged in a plurality of groups. For example, one group of guide members 32 may be arranged to guide the upper horizontal frame number 16a into an abutting relationship with one of the vertical frame members, e.g. frame member 16c. For example, referring to FIG. 3A, one group of guide members (for example, guide members 32a, 32b, and 32c) may be arranged such that one of its guide members 32a may be located on the upper outside edge of upper horizontal frame member 16a, while another guide member 32b may be located on the lower inside edge of upper horizontal frame member 16a, both adjacent the end of horizontal frame member 16a, and optionally generally aligned with each other to form a receiving space for the frame member there between.

To align left end vertical frame member 16c into an abutting relationship with upper horizontal frame member 16a, guide member 32c is located on the outside edge of vertical frame member 16c, at or near the top end of vertical frame member 16c. Further, guide member 32b is optionally located at or near the inside edge of the top end vertical frame member 16c to thereby form a receiving space between guide member 32b and guide member 32c for aligning vertical frame member 16c.

Alternately, a fourth guide member (not shown) may be provided on the inside edge of vertical frame member 16c. However, in order to reduce the weight of the substrate, it may be beneficial to keep the number of guide members to an optimal level where each guide member provides multiple guide surfaces, where possible.

In a similar manner, the lower end of vertical frame member 16c and lower horizontal frame member 16b may be aligned by a second group of guide members, such as shown in FIG. 2.

In the illustrated embodiment, a third set of guide members is provided to align vertical frame member 16c between the first and second set of guide members. Referring again to FIG. 3A, the third set of guide members includes guide members 32d and 32e located on either side of vertical frame number 16c, and optionally aligned to thereby define a space between the respective guide members for receiving and aligning the vertical frame member 16c. For example, the third group of guide members may be at least generally centrally located between the first and second group of guide members. Therefore, although not specifically called out, in addition to frame members 16a, 16c and frame members 16b, 16c, each set of intersecting frame members, namely, frame members 16a, 16d, frame members 16a, 16e, frame members 16a, 16f, frame members 16a, 16g, frame members 16b, 16d, frame members 16b, 16e, frame members 16b, 16f, and frame members 16b, 16g may have a group of guide members at each joint similar to guide members 32a, 32b, 32c and a group of guide members in intermediate positions similar to guide members 32d, 32e.

Thus, at least some of the guide members 32 may be arranged in pairs and, further, depending on the configuration of the frame, in rows and columns to define there between the receiving spaces for the various frame members.

Depending on the spacing of frame members 16h, some guide members, such as guide members 32f, may be shared and provide opposed guide surfaces 33a, 33c (FIG. 3B) for aligning frame members 16h in their horizontal orientations, such as shown in FIG. 2. Similarly, guide members 32g located in the inside edge of upper and lower horizontal frame members 16a, 16b may provide guide surfaces for vertical frame members 16d, 16e and for internal frame members 16h.

Thus, many of the guide members may provide two or three guide surfaces for aligning their respective frame members.

In the illustrated embodiment, guide members 32 are formed from rigid plates, such as metal plates, including aluminum metal plates. Depending on the side of the frame members, the thickness of the plates may be increased, such they form "blocks". Further, the plates are generally rectangular with four straight sides, which form the guide surfaces. Additionally, the guide members may be formed from the same size plates or may vary depending on the desired application. For example, the guide members located between horizontal frame members 16h may be increased in size to provide guide surfaces to both the horizontal frame numbers (16h) above and below the guide members.

Alternately, the guide members may be formed from pins or bars, hollow cylindrical members, or angles, or other structural shapes. Additionally, in any of the above, the guide members may have a sufficient height to provide, in effect, three dimensional fixturing. To that end, some or all the guide members may have supports—such as clamps or stops (including deployable clamps or stops that can be mounted and then removed or moved from a stowed position to a deployed position) that assist in holding the frame while in its three dimensional configuration while being welded.

To mount the respective guide members to the substrate, guide members 32 may be secured by adhesive and/or by fasteners. In this manner, when mounted using fasteners or some adhesives, guide member 32 may be removable for reconfiguring the arrangement of the guide members, if desired, for example during a model change where the frame has been modified. For example, some adhesives will release with heat or chemical application, and others with an impact that creates a shear force sufficient to shear the adhesive.

Further, depending on the configuration of the frame, substrate 30 may have guide members for two or more different frames. For example, frames that share a common outline, but have a different internal configuration, may be able to share the same fixturing substrate. To that end, the guide members may be color coded—so that the guide members for each frame are clearly identified—or may be removable.

In one embodiment, substrate 30 includes a flexible guide member arrangement. For example, substrate 30 may include plurality of guide member mounts fixed to the substrate, for releasably mounting the guide members to the substrate. For example, the mounts may comprise plates or discs, such as metal plates or discs. The guide members may be releasably mounted to the mounts by releasable connections, for example, snap fit, twist and lock, or threaded connections. The guide members mounts may, therefore, be arranged for one or more frames, with the guide members then mounted in the mounts that correspond to a frame to be welded.

Figure 3C:
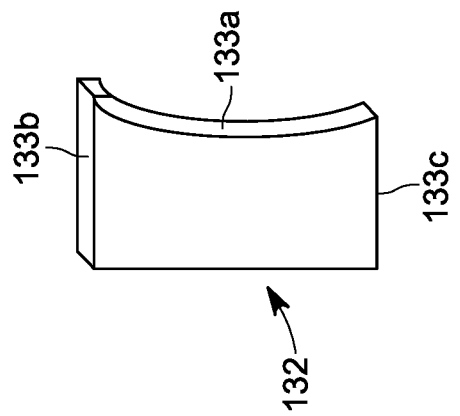
FIG. 3C is an enlarged perspective view of another embodiment of one of the guide members.

Referring to FIG. 3C, in another embodiment of the guide members, guide members 132 include one or more curved sides to form curved guide surfaces 133a to accommodate curved frame members. In a similar manner to guide members 32, guide members 132 may also provide additional guide surfaces 133ab, 133c on their other sides, which may be straight or curved depending on the construction of the frame.

As noted above, substrate 30 may be formed from a fire or heat resistant material. Alternately, substrate 30 may be formed from a material that may require protection from the heat associated with the welding of the various weld points on and frame 16. To that end, welding fixture 24 may include a plurality of patches 34 of heat dispersing material, such a heat reflective material, located on the flexible substrate in locations that correspond to the weld points on frame 16 to disperse heat from the welding at the weld points. For example, the patches 34 may comprise metal-based patches, including copper or steel patches, such as copper or steel pads, which are secured to substrate 30 using adhesive.

In the illustrated embodiment, patches 34 have a rectangular configuration. However it should be understood that they may vary in shape as well as size, depending on how large the weld point is and whether the patches are configured to extend under two adjacent weld points. However, it should be understood that the patches may be configured as strips that extend from one side of the substrate to the other side of the substrate so that they extend under all the weld points aligned above the patch.

Figure 4A:
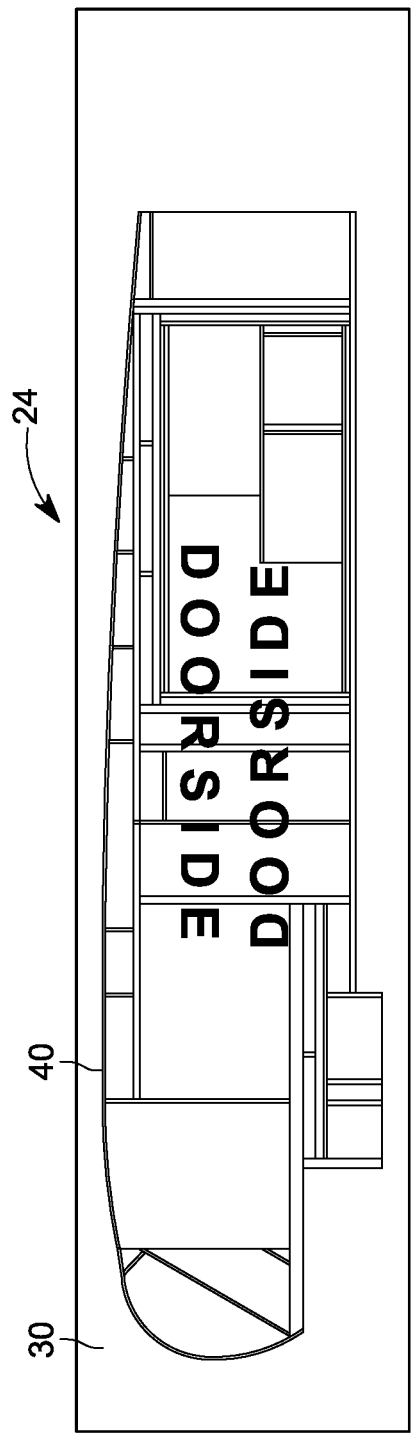
FIG. 4A is a plan view of another embodiment of the flexible welding fixture with pre-printed illustration of a frame to facilitate placement of the frame members, with the guide members and patches removed for clarity.
Figure 4B:
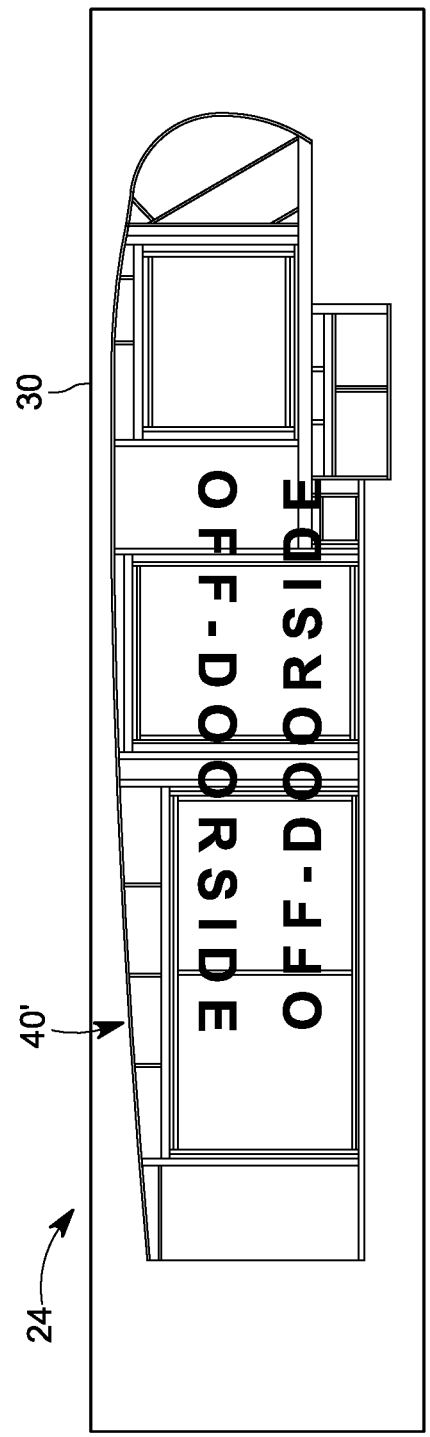
FIG. 4B is a plan view of another embodiment of the flexible welding fixture with pre-printed illustrations of another frame to facilitate placement of the frame members, with the guide members and patches removed for clarity.

In another embodiment of the substrate, as best seen in FIGS. 4A and 4B, substrate 30 may also include a visual guide 40 (40' in FIG. 4B), such as an outline of a frame, to facilitate aligning the frame members of the substrate, in addition to the guide surfaces provided by guide members 32. Optionally, substrate 30 may also include relevant information printed thereon, such as the frame part number, the unit model number, as well as information regarding the frame members, such as the frame member sizes and lengths.

In one embodiment, the outline may be preprinted onto the substrate. In another embodiment, the outline of the frame may be applied manually. For example, a master frame may be placed on the substrate and traced using a marker, such as a permanent marker, which is used to create the outline of the master frame and, thereby, transfer the outline onto the substrate. Alternately, the outline may be printed using a printer and an image file of the frame.

Referring to FIGS. 7-10, flexible fixture 24 is supported on a flat hard surface, such as a welding table 60. Table 60 may be a fixed table, with a fixed support surface, or may be an adjustable table that can increased its support surface size as needed. For example, the illustrated embodiment, table 60 comprises an adjustable table with a fixed frame 62 with a first support surface 62a, such as a flat metal sheet or plate, supported by a plurality of legs 64 (with optional lateral bracing 64a). Table 60 also includes one or more movable frames 66, which are each supported on wheeled legs 68 (which are also optionally reinforced by lateral bracing 68a) and which support discrete separate support surfaces 66a, 66b, 66c, 66d, and 66e, such as flat metal sheets or plates, which can be moved toward or away from the end of fixed frame 62 to increase or decrease length of the table 60 as needed.

Figure 6:
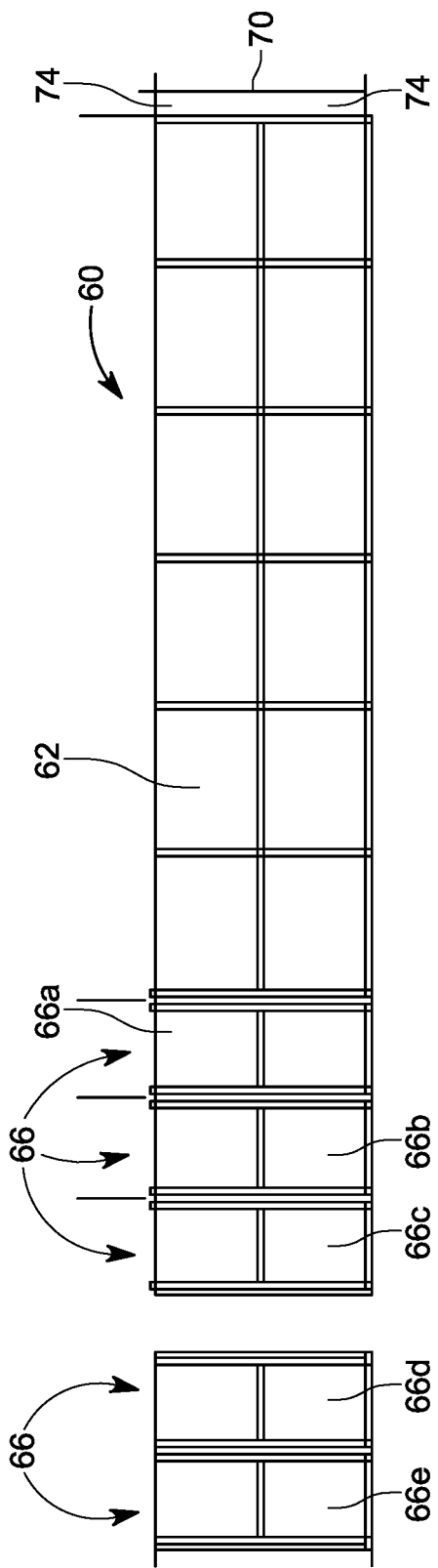
FIG. 6 is a plan view of an extendable table.
Figure 7:
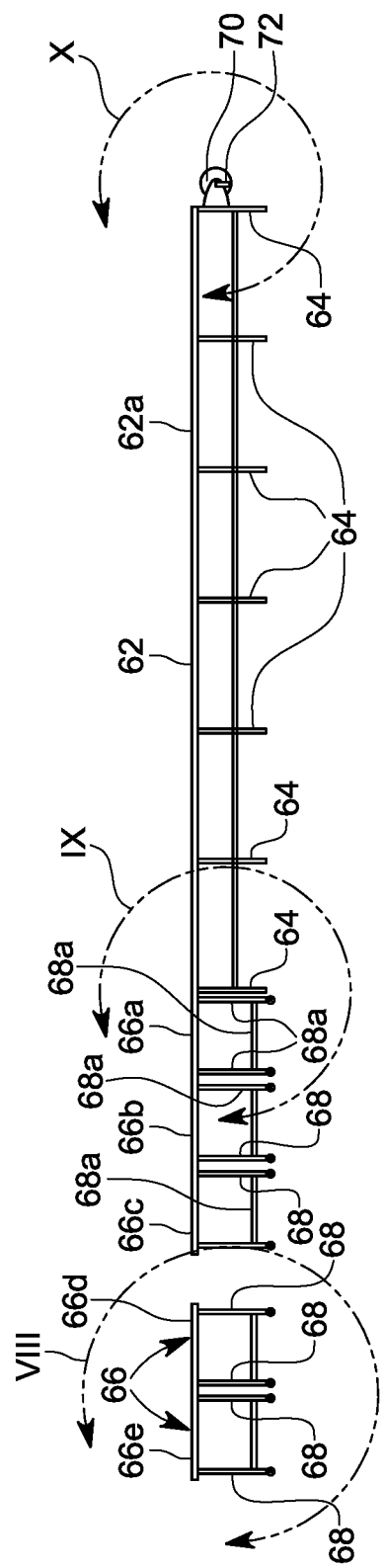
FIG. 7 is an elevation view of the extendable table of FIG. 6.
Figure 9:
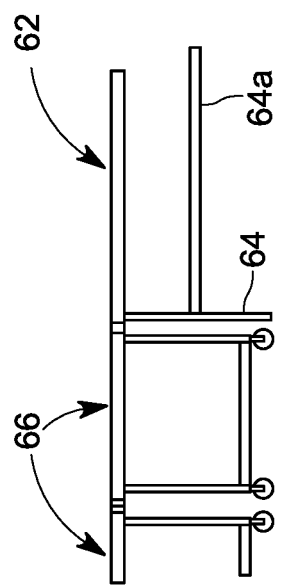
FIG. 9 is an enlarged detail view of detail IX of FIG. 7.
Figure 10:
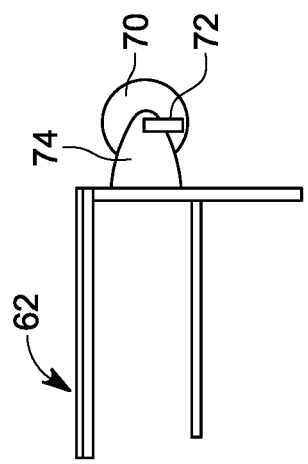
FIG. 10 is an enlarged view of detail X of FIG. 7.
Figure 8:
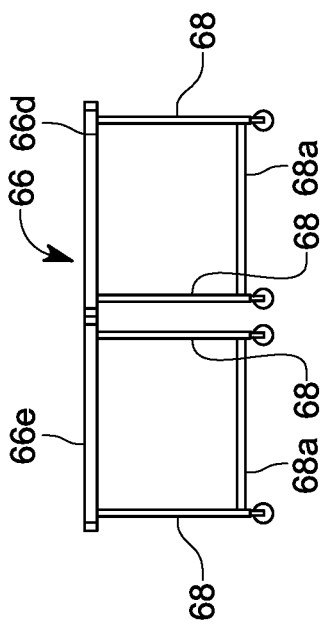
FIG. 8 is an enlarged view of detail VIII of FIG. 7.

To facilitate handling of the fixture 24 on table 60, table 60 may include one or more rollers 70, each with a handle 72, mounted to its other end by pair of brackets 74 (FIG. 6) to facilitate moving the substrate onto or off the table. For example, the brackets may be mounted to the supporting legs at the fixed end of table 60 so that roller 70 is adjacent the support surface 62a of fixed frame 62.

In one embodiment, multiple rollers may be provided that form a "carousel" type arrangement, where a plurality of rollers are arranged in at least a rotatable semi-circular arrangement (or for any arrangement up to 270 degrees), with each roller supporting a substrate in a rolled configuration. Once a rolled substrate is placed adjacent the end of the table and unrolled, it can then be used on the table. Once used, it can then be returned to the roller for later use. Further, to move the roller out of the way, once the substrate is returned to the roller, the roller may be moved to a vertical holding position so the adjacent roller can then be positioned at the end of the table. This can be repeated until the last roller is placed adjacent the table. It should be understood that this process does not have to be in sequence, and that any of the rollers that are moved to their vertical position can be lowered to again be placed adjacent the end of the table for deploying its rolled up substrate. Alternately, all the rollers may be moved to a vertical holding position until they are to be positioned adjacent the end of the table—in which case, the rollers may be arranged in any arcuate arrangement, including up to 360 degrees.

To facilitate retaining substrate 30 in a fixed position on table 60, the substrate may be stretched and tensioned across table 60 using a tensioning mechanism mounted to the underside of the table, which may include grippers to grip the substrate 30 and then a tensioner to pull on the grippers, or using cords, described below.

In one embodiment, substrate 30 may include a gripping surface to facilitate gripping and pulling of substrate 30 along the table, for example, when the fixture 24 is being loaded on to the table or being taken off the table, and also for tensioning of the flexible substrate.

Figure 5B:
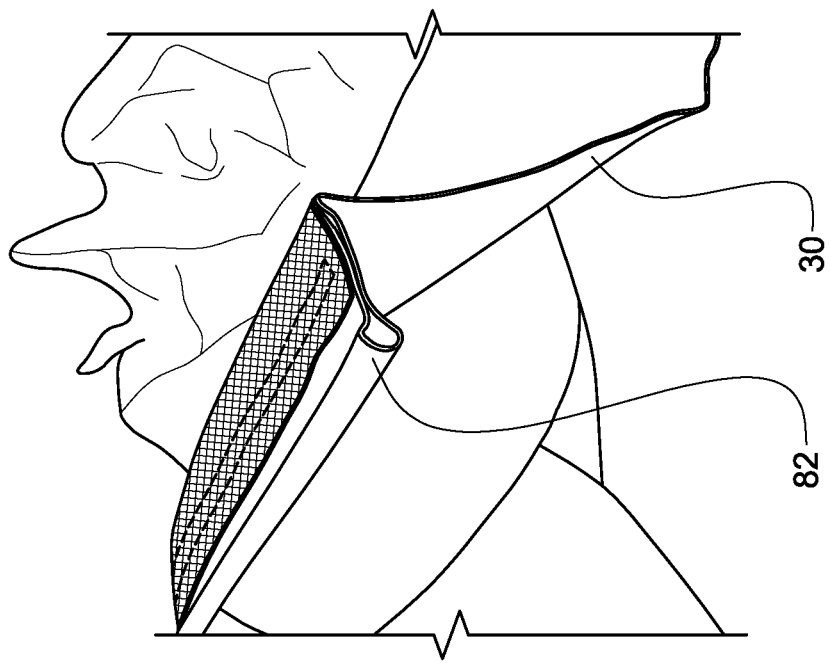
FIG. 5B is an enlarged view of the inside edge of the substrate.
Figure 5A:
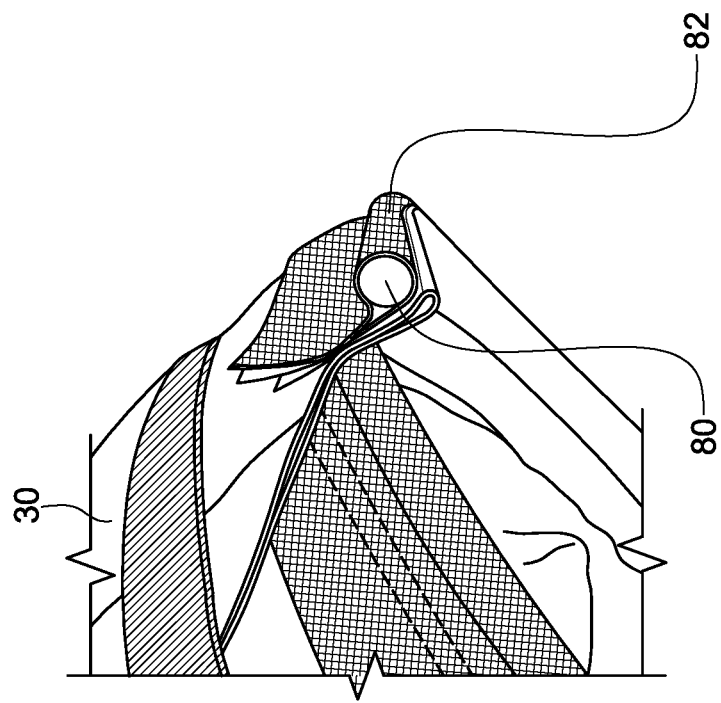
FIG. 5A is an enlarged view of the outside edge of the substrate.

For example, the gripping surface may be formed by a cord 80 (FIG. 5A), such as a rope, including a polyester rope, that is secured to the edge of the substrate.

In one embodiment, the cord is secured by sewing a loop 82 (FIG. 5B) at the edge of the substrate with the cord threaded into the loop. Alternately, the cord may be simply attached the edge, such as by sewing or adhesive. The cord may extend along a portion of the perimeter, such as along two or more sides of the substrate or just a portion or portions of the sides, or it may extend around the full perimeter.

In another embodiment, a loop may be formed on the ends and/or sides of substrate through which a cord is pulled to tension the substrate by pulling on the ends of the cord, for example under the table.

Accordingly, a method of fixturing a metal frame for a recreational vehicle includes the steps of providing a flexible substrate, mounting a plurality of guide members to the flexible substrate to form a plurality of receiving spaces in a predefined arrangement, aligning frame members in the receiving spaces between the guide members in the predefined arrangement, and welding the frame members together at a plurality of weld points to form the metal structural frame for a recreational vehicle (RV).

As noted above, the flexible substrate may be support on a table, and further may be tensioned across the table.

Accordingly, a welding fixture for a frame and method of fixturing a frame for welding is disclosed that can be easily stored and handled.

We claim:

1. A welding fixture for holding components to be welded, said welding fixture comprising:
    a flexible substrate, said flexible substrate being sufficiently flexible to be reconfigurable between a planar configuration and a folded or rolled compact configuration and being dimensioned to support a plurality of frame members to form a structural frame for a recreational vehicle (RV); and
    a plurality of guide surfaces mounted to said flexible substrate, said guides surfaces arranged on said flexible substrate to align the frame members in a predefined arrangement with a plurality of weld points and to align the frame members in said predefined arrangement while being welded together at the weld points.

2. The welding fixture according to claim 1, wherein said flexible substrate comprises a sheet of vinyl.

3. The welding fixture according to claim 2, further comprising a plurality of patches of heat dispersing material located on said flexible substrate in locations to correspond to the weld points to disperse heat from the welding at the weld points.

4. The welding fixture according to claim 3, wherein said patches comprise metal-based patches.

5. The welding fixture according to claim 4, wherein said patches comprise copper or steel patches.

6. The welding fixture according to claim 1, wherein:
    said guide surfaces are arranged on said flexible substrate to form at least a first group of guide surfaces, said first group of guide surfaces arranged to align a first frame member of the plurality of frame members and a second frame member of the plurality of frame members in an abutting relationship to form a first weld point of the weld points.

7. The welding fixture according to claim 6, wherein:
    said guide surfaces are arranged on said flexible substrate to form a second group of guide surfaces, said second group of guide surfaces arranged to align the second frame member and a third frame member of the plurality of frame members in an abutting relationship to form a second weld point of the weld points.

8. The welding fixture according to claim 7, wherein:
    said guide surfaces are arranged on said substrate to form a third group of guide surfaces arranged to align the second frame member between said first and second groups of guide surfaces.

9. The welding fixture according to claim 7, further comprising a first patch of heat dispersing material located on said flexible substrate to correspond to the first weld point and a second patch of heat dispersing material located on said flexible substrate to correspond to the second weld point.

10. The welding fixture according to claim 1, further comprising rigid plates secured to said flexible substrate, and said rigid plates forming said guide surfaces.

11. The welding fixture according to claim 10, wherein said rigid plates are secured to said flexible substrate with adhesive.

12. The welding fixture according to claim 10, wherein said rigid plates comprise metal plates.

13. The welding fixture according to claim 1, wherein said flexible substrate includes a visual guide for aligning the plurality of frame members in addition to the guide surfaces.

14. The welding fixture according to claim 1, wherein said flexible substrate includes a perimeter, and at least a portion of the perimeter having a gripping surface for tensioning the flexible substrate.

15. A welding fixture for holding frame members to be welded, said welding fixture comprising:
    a flexible substrate, said flexible substrate being sufficiently flexible to be reconfigurable between a planar configuration and a compact configuration, and said flexible substrate being dimensioned to support a plurality of frame members to form a structural frame for a recreational vehicle (RV); and
    a plurality of guide members mounted to said flexible substrate in an arrangement of rows and columns to define there between receiving spaces for receiving and aligning the plurality of frame members in a predefined arrangement with a plurality of weld points and to align the frame members in said predefined arrangement while being welded together at the weld points.

16. The welding fixture according to claim 15, wherein said guide members comprise rigid plates secured to said flexible substrate.

17. The welding fixture according to claim 15, further comprising a plurality of patches of heat dispersing material located on said flexible substrate in locations to correspond to the weld points to disperse heat from welding at the weld points.

18. A method of fixturing a metal structural frame for a recreational vehicle, the method comprising the steps of:
    providing a flexible substrate of claim 1;
    aligning frame members between the guide surfaces; and
    welding the frame members together at a plurality of weld points to form the metal structural frame for a recreational vehicle (RV).

19. The method according to claim 18, further comprising supporting the flexible substrate on a table.

20. The method according to claim 18, further comprising tensioning the flexible substrate.

* * * * *